United States Patent [19]

Coulstring

[11] 3,892,089
[45] July 1, 1975

[54] WELD COUPON SAMPLE CUTTER

[75] Inventor: Robert N. Coulstring, Hanover, Mass.

[73] Assignee: Triangle Engineering, Inc., West Hanover, Mass.

[22] Filed: July 2, 1974

[21] Appl. No.: 485,221

[52] U.S. Cl. ............... 51/34 D; 51/37; 51/216 H
[51] Int. Cl. ............................................. B24b 27/06
[58] Field of Search ........ 51/34 D, 34 E, 34 R, 37, 51/38, 45, 92 ND, 216 ND, 216 H

[56] References Cited
UNITED STATES PATENTS

| | | | |
|---|---|---|---|
| 914,303 | 3/1909 | Peirce | 51/34 E X |
| 1,902,279 | 3/1933 | Evans | 51/34 E X |
| 2,324,266 | 7/1943 | Muskovin | 51/92 ND |
| 2,397,086 | 3/1946 | Brady | 51/92 ND X |
| 2,488,643 | 11/1949 | Smith | 51/34 D X |
| 2,600,323 | 6/1952 | Ransome | 51/92 ND X |

*Primary Examiner*—Donald G. Kelly
*Attorney, Agent, or Firm*—Charles E. Pfund, Esq.

[57] ABSTRACT

A machine for cutting weld coupon samples for testing the effectiveness of welds performed by welders which can be used in any location such as at the job site in accordance with the appropriate ASME and AWS standards has provisions for holding and indexing the welded sample piece and semiautomatically cutting the requisite number and size samples at selected positions on the text sample to obtain representative samples of the welder's work which samples can be readily tested to determine whether or not the welder has qualified by performing acceptable welded joints.

10 Claims, 6 Drawing Figures

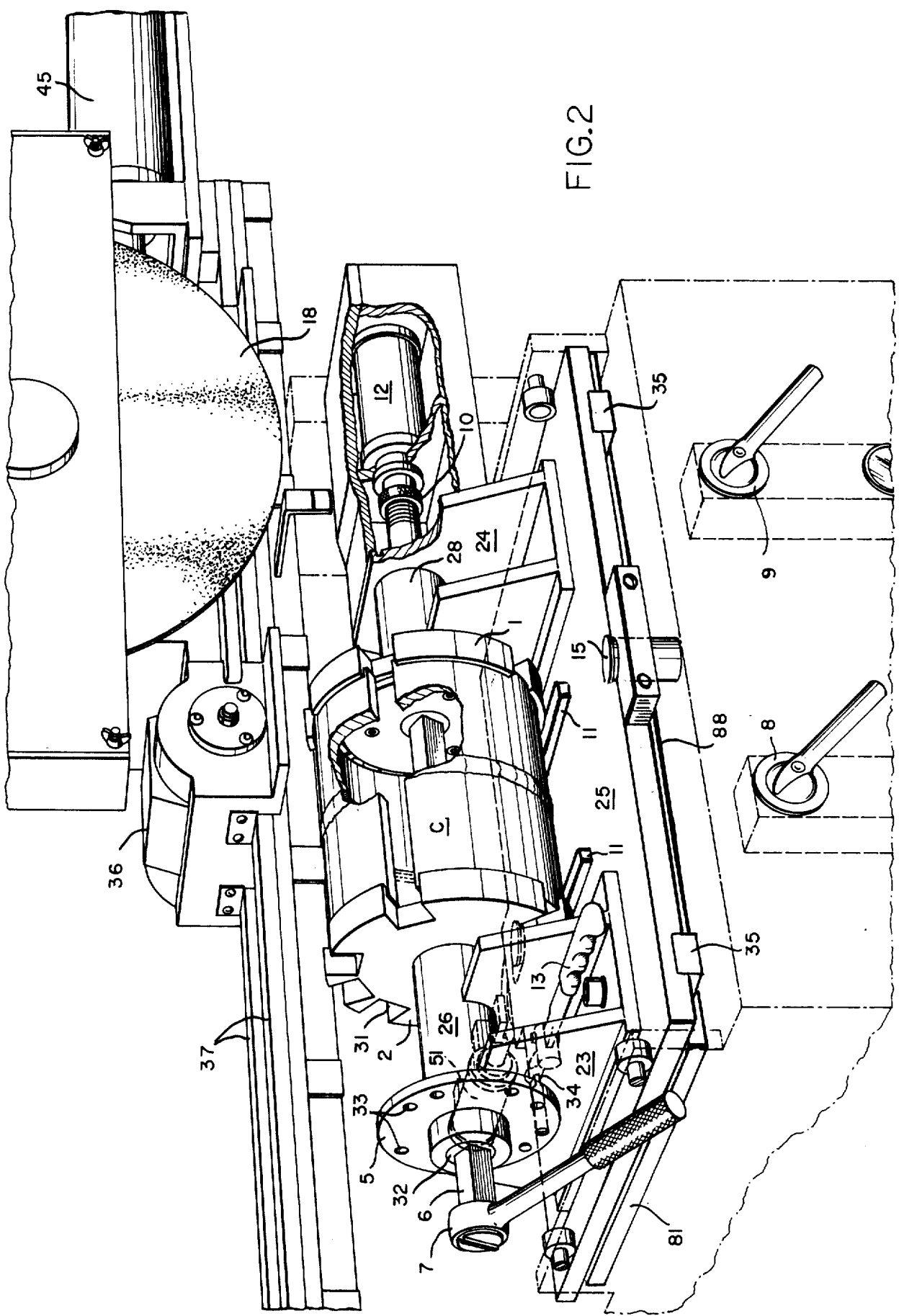

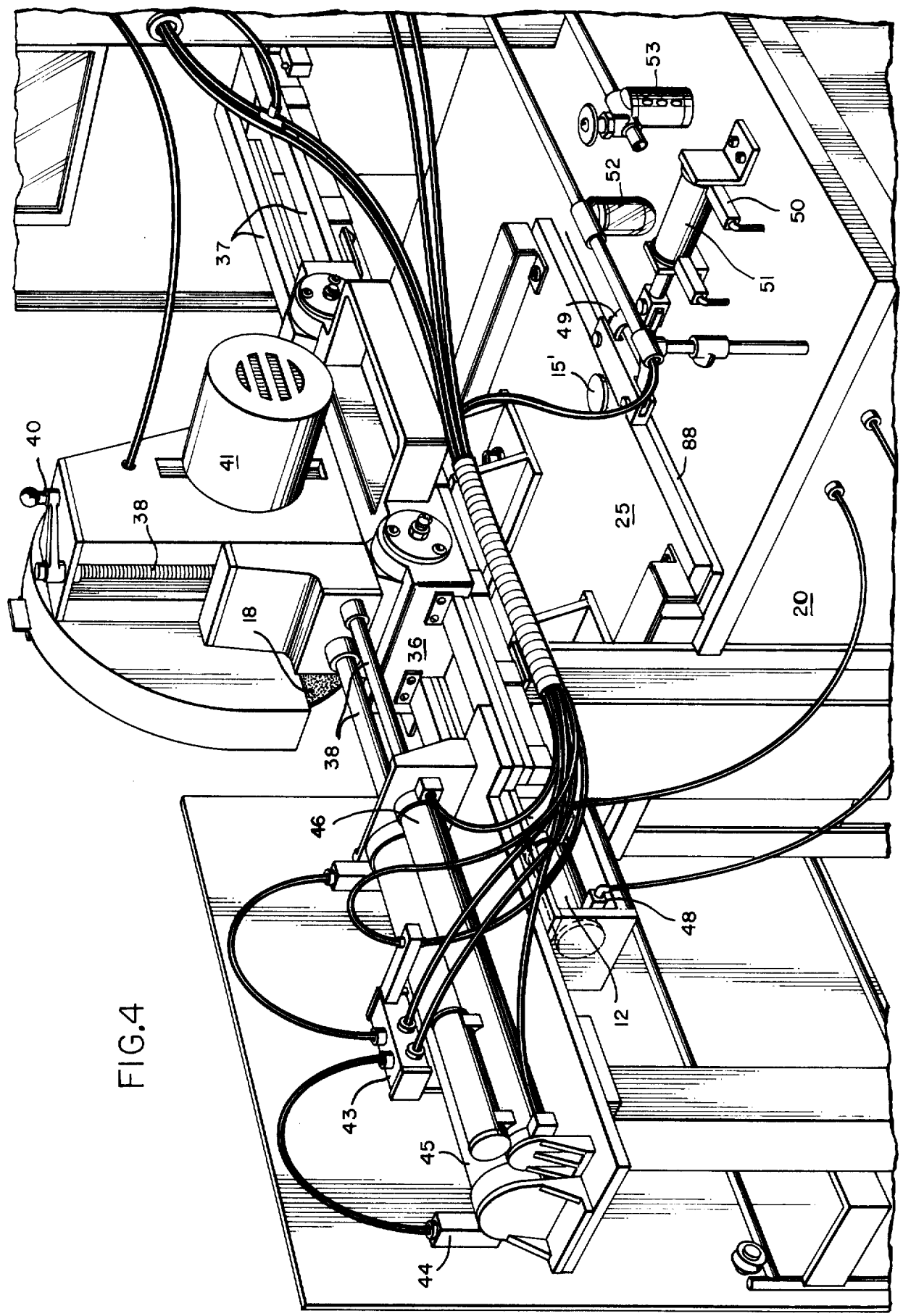

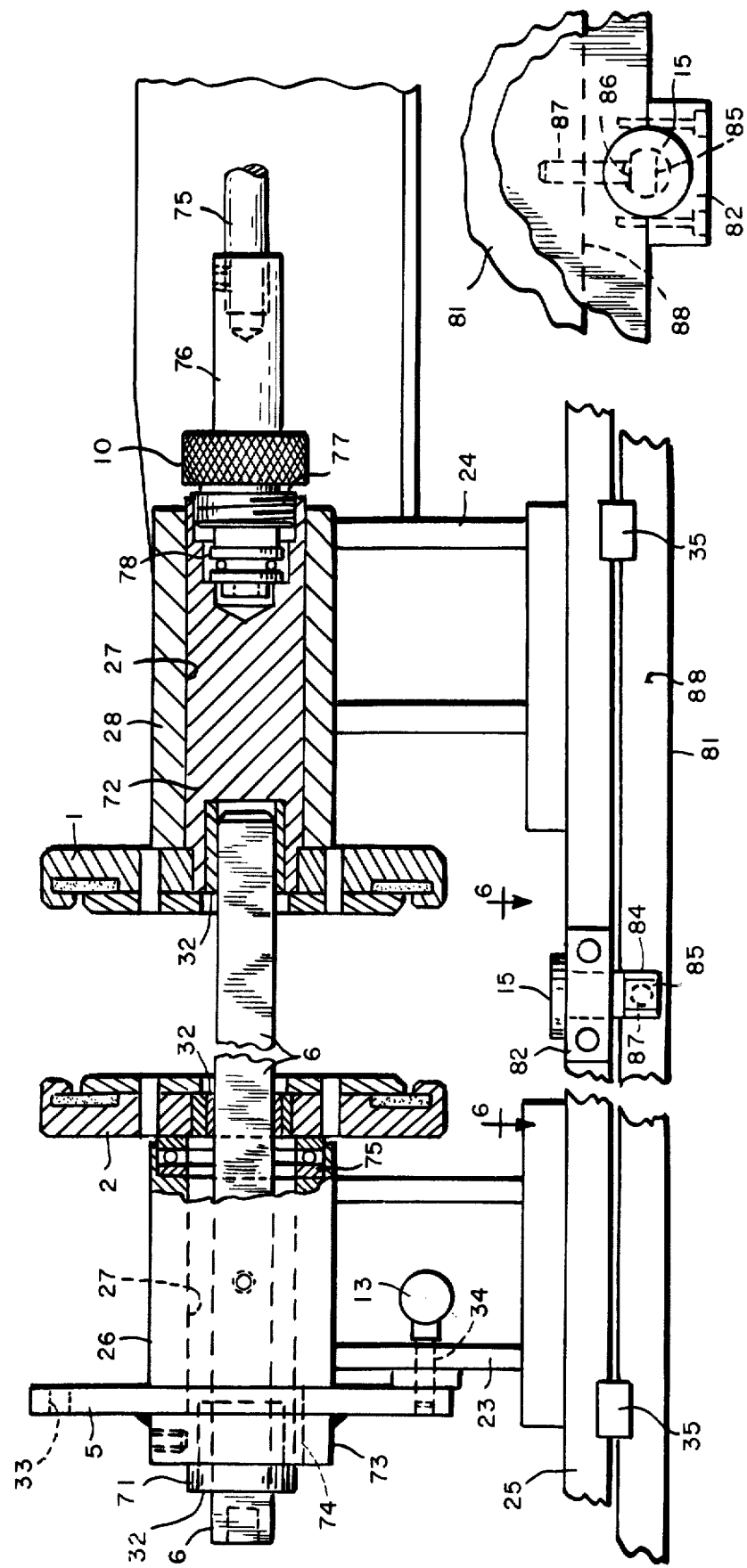

3,892,089

WELD COUPON SAMPLE CUTTER

BACKGROUND OF THE INVENTION

The use of welded joints in various forms of construction is now standard practice particularly structures having structural steel load bearing members where such joints are required to be loaded near the design limit of the structural member. It is, accordingly, essential that the welds performed by trained welders be able to meet the standards which have been established in order that the overall structure can have the requisite strength and provide the designed factor of safety in terms of the anticipated loads. Similar standards must be met for pipe welds where various fluids must be contained under high pressure. By the nature of construction practices large numbers of employees on a large scale job will be hired and those who are hired as welders represent themselves as being qualified, but in view of the criticalness of assuring full strength welded joints in highly loaded structural members, it has become the practice to administer an on-site test to such job applicants to make sure that an individual's welding technique produces a full strength weld. Heretofore, this test weld has been performed on a standard form with the weld joining two similar metal pieces and this weld sample is then cut to obtain samples which can be appropriately tested and physically examined in the area of the weld cross-section. This procedure prior to the present invention involved a delay of a day or more while the test sample and critical examination and strength tests have been performed with the resultant cost of wages for the welder and the inconvenience for the contractor in obtaining qualified welders on the job ready to work.

SUMMARY OF THE PRESENT INVENTION

In accordance with the present invention applicant provides a machine having semi-automatic operated clamping jaws for a welded sample with selectable indexing features for positioning the sample successively in the path of an abrasive cutting wheel and semi-automatic feeding mechanism for making successive passes at the successively indexed positions of the coupon for cutting therefrom strips of steel which contain at approximately the mid-point location of the cut strip a portion of the weld which has been performed by the welder applicant who has welded the test piece. With this arrangement a uniform set of samples of the weld work performed by the applicant is obtained with each sample selected from distributed positions along the length of the weld and having the standardized characteristics required for evaluation and testing as established by the ASME Section IX and AWS requirements.

DESCRIPTION OF THE DRAWINGS

FIG. 2 is a partial view of the apparatus showing in perspective the arrangement for taking weld samples from a cylindrical weld coupon.

FIG. 4 is a partial perspective view from the rear of the apparatus shown in FIGS. 1 and 2.

FIG. 5 is an assembly drawing, partly in section showing details of the rotary support for the clamp plates.

FIG. 6 is a fragmentary plan view of the slide plate stop adjustment for selecting width of the cut sample.

DESCRIPTION OF THE PREFERRED EMBODIMENT

Figure 1:
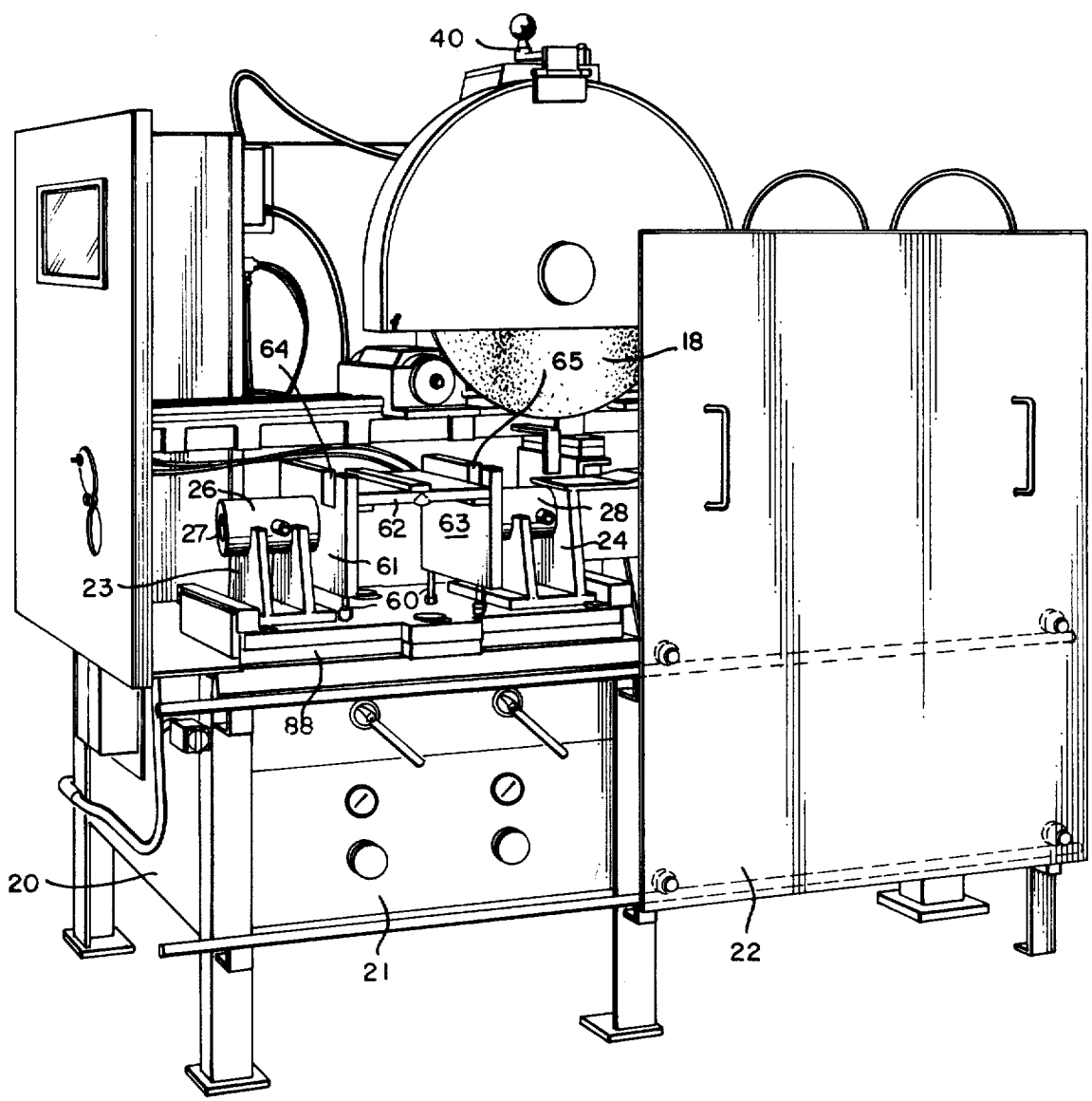
FIG. 1 is a general perspective view of the apparatus set up for taking a sample from a flatplate weld.

Referring to FIG. 1 a general view of the apparatus shows a base 20 supported from the floor by legs and providing a horizontal top platform upon which the operating portions of the apparatus are mounted. A front panel 21 is arranged with suitable controls and the entire cutting portions of the apparatus which are supported on the platform of frame 20 are enclosed behind a suitable shield including a sliding door 22 which permits the entire cutting operation to take place within the protective shield to avoid exposing the operator to hazards during the cutting of a sample. On the supporting platform a movable plate 25 is arranged and has fixed thereto a front pedestal 23 and a rear pedestal 24. The pedestal 23 supports a cylindrical member 26 having a horizontal bore 27 and a corresponding bored cylindrical member 28 is supported on the rear pedestal 24. A front plate mounting fixture 61 is shown in FIG. 1 which is mounted by an integral cylindrical projection which extends into the bore 27. A similar rear plate mounting fixture 63 is supported on the cylindrical member 28 by an integral cylindrical member which projects into the bore of member 28. The clamp plates 61 and 63 are notched at 64 and 65 slightly wider than the width of the sample being cut and for taking a sample from a flat plate weld the mounting fixtures 61 and 63 are rigidly supported in the cylindrical members 26 and 28 on legs 60.

Referring now to FIG. 2, a more detailed view of the mounting fixture is shown as adapted for taking a preprogrammed set of cuts from a cylindrically welded coupon such as the weld connecting two sections of a large diameter pipe. For such specimens a front clamp plate 2 in the form of a disc having peripheral notches 31 located in the periphery of the disc is provided, the notches 31 being located at the points around the periphery of the disc and having width in accordance with a preprogrammed set of samples to be cut from the cylindrical weld coupon such as in accordance with the ASME Section IX standard. A similar rear clamp plate 1 in the form of a disc has the same general configuration as the front clamp 2 and is mounted opposed thereto. Each of the clamping plates 1 and 2 has an integral cylindrical projection which fits smoothly within the bore of the respective cylindrical mounting members 26 and 28. As shown in detail hereinafter, (FIG. 5), the mounting for the clamp plates 1 and 2 in the members 26, 28, provides for indexed rotation in order to align the notches 31 successively with the cutting path of the abrasive cutting wheel 18. For this purpose an indexing plate 5 is keyed to the projection from the front plate 2 which passes completely through the cylindrical supporting member 26. Each end of this projection has an insert 32 with a square hole axially aligned therein to receive a square drive shaft 6, the end of which is fitted with a ratchet handle 7.

The index plate 5 has a plurality of index holes 33 arranged peripherally at predetermined positions and can be successively positioned by rotating the plate 5 upon operation of ratchet handle 7 such that the index holes 33 appear opposite an index stop 34 laterally movable by a manually operated lever handle 13. Thus by operating the handle 13 as shown in FIG. 2 to disengage index pin 34, the ratchet handle 7 can be operated to rotate the plate 5 until the next index hole 33 is aligned with pin 34 whereupon release of the handle 13 to return the pin 34 to an indexing position engages the hole 33 then opposite the pin 34 to establish a predetermined rotary position for the rotating portions of the apparatus. By virtue of the square drive shaft 6 which passes through the cylindrical support 26 and engages the inserts 32 at both ends of the projections from the rear clamp plate 2 and the front clamp plate 1, both of the clamp plates 1 and 2 are aligned in predetermined relation with the index plate 5 and the three members 1, 2 and 5 rotate as a unit when ratchet handle 7 is operated.

For clamping the pipe weld coupon between the front and rear clamp plates 1 and 2, the rear clamp plate 1 is axially slidable by means of its projection in the bore of member 28 which connects to the piston rod of an air cylinder 12. Operation of the cylinder 12 to extend and retract the piston rod is achieved by means of a front panel control 9 for supplying air under pressure to the cylinder 12 as required. The piston rod of cylinder 12 is connected by a knurled nut 10 to the end of the projection from rear clamp plate 1 which extends to the bore in member 28. With this threaded engagement the retraction stroke of the piston in cylinder 12 will withdraw the rear clamp plate 1 from engagement with the pipe weld coupon for removal of same. The end of the intermediate connecting member from the piston rod of cylinder 12 has a conventional thrust bearing for bearing against the projection from rear clamp plate 1.

The front clamp plate 2 also has a ring thrust bearing against which it is preseed when a cylindrical weld coupon is clamped therein which thrust bearing is mounted at the right hand end of cylindrical member 26.

The table 25 on which the pedestals 23, 24, are fixedly mounted is movable on slides in a direction transverse to the axis of drive shaft 6. For this purpose an air cylinder 51 is located to the rear of the plate 25 and connected thereto as will hereinafter be described. A stop pin 15 projecting through a bored hole in the table 25 provides limit stops for this motion as hereinafter described. The application of compressed air to the cylinder 51 to control the position of the table 25 is achieved by slide plate cylinder valve 8.

The abrasive cutoff wheel 18 is mounted on a carriage 36 which rides on rails 37 to move parallel to the axial direction of drive shaft 6 under the control of an air cylinder actuator 45. The plane rotation of the cutting disc 18 is the vertical plane extending parallel to the axis of drive shaft 6 and for each adjusted position of table 25 the wheel 18 will make a vertical longitudinal cut through a cylindrical weld coupon clamped between the end plates 1 and 2. Referring to FIG. 4, for further details of the mounting of the abrasive cutoff wheel 18, the rear view of the carriage 36 and sliding guides or tracks 37 are shown. The cutoff wheel 18 is driven directly from an electric motor 41 and the rotative assembly is mounted for vertical adjustment by means of jack screw 38 controlled by handle 40. By rotating handle 40 the vertical position of the wheel 18 can be selected to establish the depth of cut relative to the thickness of the wall sample clamped between end plates 1 and 2. The carriage 36 supporting the cutoff wheel 18 is translated along the tracks 37 by air cylinder 45 in conjunction with cylinder check device 46, both of which are connected by piston rods 38 to the carriage 36. The air cylinder 45 and cylinder check 46 may be, for example, a Hyracheck unit available from Allenair, Incorporated in New Jersey.

Referring further to FIG. 4, the operating mechanism for the table 25 and the hydraulic system will be further described. A air cylinder actuator 51 is fastened to the platform support on the frame 20 and the piston rod extending therefrom is coupled to the table 25 through a yoke 49. An additional stop pin 15' corresponding to the pin 15 at the front of the table 25 projects through a bored hole to limit the back-and-forth motion of the table 25.

The air pressure system is conventional and includes a source of compressed air, lubricator 53, a filter 52, the various flow control valves, including valves 8 and 9 previously described and flow control elements 44, 48 and 50 for the various actuator cylinders. In addition to the air pressure conduits, suitable electrical circuits are provided for energizing the motor 41 including load indicator means such as an ammeter for controlling the rate of cut as the abrasive wheel 18 is cutting the weld coupon to form a sample.

Referring to FIGS. 5 and 6, further details of the rotary mount for clamping and cutting type weld coupons will be described. Each of the cylindrical members 26, 28, has an axial bore 27 within which rotates the respective shafts 71, 72, extending from the back surface of the respective clamp plates 2, 1. The inserts 32 are shown with the aforementioned axial aligned square holes for receiving square drive shaft 6. With this arrangement the clamp plates 1 and 2, with their integral shafts 71 and 72 rotate as a unit when the drive shaft 6 passes through the square insert holes in element 32 to lock them together. The index plate 5 has a hub 73 welded to the face thereof and has an axial bore hole such that it can fit over shaft 71 and keyed thereto by means of a key and key way 74. Tnus the index plate 5 rotates as a unit with the rotating elements.

The end of the cylindrical member 26 adjacent the clamp plate 2 is recessed to receive a thrust bearing 75. The clamp plate 2 is thus axially fixed in place to react the clamping force when a type weld coupon is in place and remain rotative to permit indexing the predetermined radial positions provided by index wheel 5.

The cylindrical member 28 supports the rear clamp plate 1 both for rotation and for axial movement with the shaft 72 sliding within the cylindrical bore 27. For this purpose, piston rod 75 of cylinder 12 is connected by a coupling 76 to the end of shaft 72 which is threaded to receive thread 77 of knurled nut 10. The end of extension 76 within shaft 72 has fitted a thrust bearing 78 which transmits clamping force from piston rod 75 to the shaft 72 to axially displace rear clamp plate 1 and apply clamping pressure to the type weld coupon clamped between plates 1 and 2. The threaded engagement of thread 77 permits the reverse stroke of piston rod 75 to withdraw rear clamp plate 1 and release the type weld coupon.

As previously mentioned, the table 25 is movable back and forth supported on the slides 35 which are fixed to a plate 81 which generally underlies the plate 25. At the location of pins 15 and 15' passing through plate 25 a rectangular extension 82 is attached as by bolting with the stop pins 15 and 15' passing through the bored holes which is partially in the plate 25 and partially in the projection 82. A lower portion 84 of pins 15 and 15' has parallel flat surfaces 85, 86 on the forward and rearward portion thereof with these flats unequally spaced with reference to the vertical central axis of the pins 15 or 15'. Cooperating with the flats 85 or 86 is a flat headed set screw which is threaded into the front edge 88 of the plate 81. By adjusting the threaded depth position of the set screw 87 at both the front position for pin 15 and the rear position for pin 15' a mechanical stop is established against which one or the other of the flats 85 and 86 on the pins 15 and 15' is arrested as the table 25 moves forward or backward. The dimensioning is such and the offset of surfaces 85 and 86 with respect to the axial center of the pins 15 or 15' are selected such that with pins 15 and 15' both selected to have surface 85 bear against the respective set screws 87, front and rear, the amount of travel for the table 25 is limited to a predetermined amount such as 1½ inches corresponding to one width of sample to be cut from the test coupon. By lifting the pins 15 and 15' partially out of their bored holes in which they rest during operation of table 25, the pins 15 and 15' can be rotated 180° and dropped back into the bored holes. This will reverse the surface flat on the lower portion of each pin which bears against the head of its respective set screw 87 as a stop and establish another predetermined amount of travel for the table 25 corresponding to another width of sample to be cut such as three-eighths inch width. In this fashion the two cuts for making a predetermined width sample can be made by merely operating slide plate control valve 8 to move the table back-and-forth until it reaches one or the other of the stops 87 operating against the respective pins 15 and 15' at the flattened portion at the bottom of each pin.

The operation of the device will now be described. Referring to FIG. 2 for a description of cutting the predetermined set of samples from a pipe weld coupon, the coupon C is placed in the fixture and for this purpose a pair of loading bars 11 are placed on the table 25, each bar having equal and suitable thickness to elevate the coupon C as it rolls thereon to a level where its longitudinal axis generally coincides with that of drive shaft 6 which is to be inserted. By operation of clamp plate control valve 9 the clamp cylinder 12 is actuated to extend its piston rod thereby moving the rear clamp plate 1 to the left as shown in FIG. 2 such that the coupon C is clamped between the rear and front clamp plates 1 and 2. To facilitate centering, the annular groove in the face of each clamp plate may have chamfered edges to act as centering guides as the coupon C is engaged by the advance of rear clamp plate 1. Upon completion of engagement, the valve 9 is released and engagement pressure is maintained in cylinder 12. For the purpose of the subsequent retraction of rear clamp plate 1, knurled nut 10 is advanced to provide threaded engagement between the piston rod of cylinder 12 and the extension from clamp plate 1 which extends through the bore of cylindrical support 28.

Figure 3:
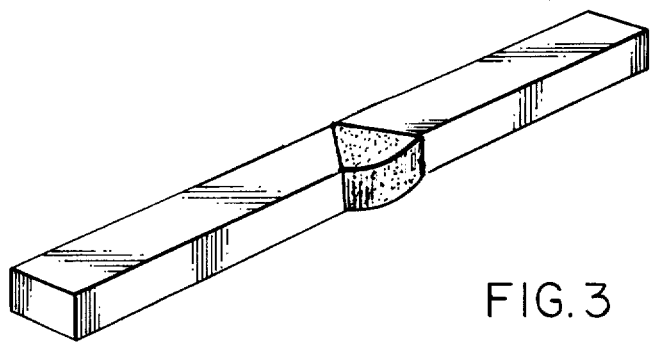
FIG. 3 is a perspective view of a weld coupon sample cut by the apparatus of the invention.

By retracting indexing element 34 by means of handle 13, the indexing plate 5 can be rotated by ratchet handle 7 to select a first index hole 32 for cutting the first sample. By actuating slide plate control valve 8, the slide plate cylinder 51 can be pressurized to advance or withdraw the table 25 to position the pins 15 or 15' against stop 87. The clamp plates 1 and 2 are thus positioned such that one edge of slot 31 is adjacent with the cutting path of abrasive wheel 18. The height of the cutting wheel is adjusted by means of control handle 40 and the door 22 is shut to enclose the entire apparatus during the cutting operation. The motor 41 is energized to rotate the cutting wheel 18 and the advance control for the advance of the carriage 36 by means of the control cylinder 45 is actuated to select an appropriate rate of feed. By observing the current load for the motor 41 to some predetermined value, a suitable rate of progress can be maintained for the carriage 36 as it makes a cut. At the end of the cut the cylinder 45 is operated to retract the carriage 36. The table 25 is adjusted to the opposite stop 87 from which the previous cut was made and the process is repeated to complete the removal of the first sample. One such sample is shown in FIG. 3 having the size and shape for conducting a standardized test thereon.

A complete set of samples from the weld coupon C is obtained by successively positioning each of the slots 31 to make two successive cuts along each edge of the slot 31, as determined by stops 87 for removing a sample by successively indexing the holes 33 by means of the handles 7 and 13. In this fashion the requisite number of samples of the correct size selected from the correct positions of the cylindrical weld coupon C are obtained for conducting the standardized tests.

For conducting tests of welds in flat plates the modified fixtures shown in FIG. 1 are employed with end plates 61 and 63 rigidly supported in the cylindrical elements 26 and 28 as previously described. The end plates 61 and 63 have an off-center slot respectively indicated as 64 and 65 which can be employed to grip the plate weld coupon 62 for a pair of cuts to extract a sample by successive cuts along the edges of the slots 64 and 65 analogous to that previously described. After the first plate sample has been obtained the remainder of the plate 62 can be unclamped and rotated 180° in the horizontal plane before reclamping and a second sample obtained from the welded plate coupon by two successive cuts along the edges of the slots 64 and 65 in the manner previously described.

With the apparatus of the present invention it is possible for welders to demonstrate their skill with an on-the-job test by preparing one or more weld coupons and taking these coupons to the sample cutting apparatus of the invention for cutting the requisite set of samples for tests. By having a sample bending machine on site the test can be completed as soon as samples are cut and the welder can be qualified to go to work within a matter of an hour or two after he appears at the work site and performs his qualifying test welds. This is a great advantage as compared to present practice where a welder may be paid a day or more in wages prior to working and the contractor on the job may be delayed by a corresponding interval of time which is the interval which usually elapses when the weld coupons prepared by an individual welder are sent to a test laboratory to determine whether or not the welds have been competently made.

Various modifications of the apparatus will occur to those skilled in the art and the invention, accordingly, is not to be considered as limited to the specific details disclosed but only by the scope of the appended claims.

I claim:

1. A weld coupon sample cutter comprising a frame, a horizontal table support mounted for limited translation back and forth in one horizontal direction on said frame, controllable actuator means operable for positioning said table support, a pair of spaced pedestals mounted on said table support and aligned in the horizontal direction normal to the direction of motion of said table support, a pair of opposed clamp plates respectively mounted on said pedestals, at least one of said clamp plates being mounted for axial motion toward and away from the other said clamp plate, second controllable actuator means operable for axially positioning the movable said clamp plate, horizontal guide rails mounted on said frame above said pedestals and parallel with the axis of alignment of said pedestals, a carriage mounted for horizontal translation on said guide rails normal to the direction of motion of said support table, an abrasive cutting wheel and power drive means for driving said wheel mounted on said carriage, said wheel rotating in a vertical plane parallel to the axis of alignment of said pedestals, means for adjusting the vertical position of said cutting wheel on said carriage for controlling depth of cut relative to said pedestals, and means operable for advancing and retracting said carriage along said rails to make a cut through a weld coupon clamped between said clamp plates.

2. Apparatus according to claim 1 in which said clamp plates are rigidly secured to said pedestals.

3. Apparatus according to claim 2 in which said clamp plates are generally rectangular in shape and each has a slot in the upper edge for passage of the rim of said wheel when a cut is made.

4. Apparatus according to claim 3 in which the slot in each said upper edge is off-set with respect to said axis of alignment of said pedestals.

5. Apparatus according to claim 1 in which said clamp plates are adapted to receive a cylindrical pipe weld coupon and clamp said coupon coaxially aligned with said axis of alignment of said pedestals, and means supporting said clamp plates for rotation about said axis.

6. Apparatus according to claim 5 in which said clamp plates are circular and have a plurality of different width slots in the peripheral edge corresponding to the number and size of a predetermined set of samples to be cut from said cylindrical pipe weld coupon.

7. Apparatus according to claim 6 and including an index wheel keyed to one of said circular clamp plates and rotatable therewith, a drive shaft of non-circular cross-section extending along the axis of rotation through said index wheel and said circular clamp plates to maintain them in fixed relative rotary relation, and a handle extending from one end of said drive shaft for manual index rotation of said clamp plates.

8. Apparatus according to claim 7 and including a manually operable detent for retaining said index wheel in selected rotary position.

9. Apparatus according to claim 1 in which said table is supported for said limited translation between limit stop means, said limit stop means comprising a pair of large diameter pins having flat surface portions projecting from said table at fore and aft positions thereon, a pair of fore and aft threaded members mounted axially to engage said flat surface portions of respective pins for the extreme positions of said table, said threaded members providing continuous precision adjustment of the limit stop positions for said table.

10. Apparatus according to claim 9 in which said pins have corresponding pairs of flat surface portions, each of said pairs being at different radial distance from the axis of said pins such that quantum changes in said limited translation can be selected by rotating said pins to have different selected surface pairs opposed to said threaded members.

* * * * *